(12) United States Patent
Ise et al.

(10) Patent No.: US 9,845,068 B2
(45) Date of Patent: Dec. 19, 2017

(54) SYNTHETIC FIBER USED FOR FABRIC

(75) Inventors: Fumiaki Ise, Tokyo (JP); Shingo Mizuno, Tokyo (JP)

(73) Assignee: ASAHI KASEI FIBERS CORPORATION, Osaka (JP)

(*) Notice: Subject to any disclaimer, the term of this patent is extended or adjusted under 35 U.S.C. 154(b) by 0 days.

(21) Appl. No.: 14/237,616

(22) PCT Filed: Dec. 7, 2011

(86) PCT No.: PCT/JP2011/078339
§ 371 (c)(1),
(2), (4) Date: Feb. 7, 2014

(87) PCT Pub. No.: WO2013/084322
PCT Pub. Date: Jun. 13, 2013

(65) Prior Publication Data
US 2014/0265279 A1 Sep. 18, 2014

(51) Int. Cl.
*D01F 6/60* (2006.01)
*B60R 21/235* (2006.01)
(Continued)

(52) U.S. Cl.
CPC ............ *B60R 21/235* (2013.01); *D01D 5/12* (2013.01); *D01D 10/02* (2013.01); *D01F 6/60* (2013.01); *D03D 1/02* (2013.01); *D03D 15/00* (2013.01); *B60R 2021/23509* (2013.01); *D10B 2401/06* (2013.01); *Y10T 428/298* (2015.01)

(58) Field of Classification Search
CPC ........ B60R 2021/23509; B60R 21/235; D10B 2401/06; D01F 6/60; D01D 5/12

USPC ........... 264/210.8; 280/728.1, 743.1; 57/200, 57/206, 243, 244; 428/365, 401; 442/59, 442/189
See application file for complete search history.

(56) References Cited

U.S. PATENT DOCUMENTS 3,303,169 A * 2/1967 Pitzl .............................. 528/335
4,496,630 A * 1/1985 Kurita ....................... D01F 6/60
264/210.7
(Continued)

FOREIGN PATENT DOCUMENTS

EP 2 256 237 A1 12/2010
JP 2006-183205 7/2006
(Continued)

OTHER PUBLICATIONS

English translation of International Search Report from the Japanese Patent Office for International Application No. PCT/JP2011/078339, dated Feb. 14, 2012.
(Continued)

*Primary Examiner* — Arti Singh-Pandey
(74) *Attorney, Agent, or Firm* — Finnegan, Henderson, Farabow, Garrett & Dunner, LLP

(57) ABSTRACT

The purpose of the present invention is to provide a synthetic fiber which is for use in fabrics having uniform fiber density, permeability and the like, is appropriate for high-density, high-speed weaving, and exhibits excellent weft insertion stability. This synthetic fiber is characterized by having: a fiber density of 200-720 dtex; an average intermediate loading modulus of more than 75 cN/dtex and less than 150 cN/dtex; and a variation coefficient of the intermediate modulus of 5% or less.

12 Claims, 5 Drawing Sheets

(51) Int. Cl.
*D03D 1/02* (2006.01)
*D03D 15/00* (2006.01)
*D01D 5/12* (2006.01)
*D01D 10/02* (2006.01)

(56) References Cited

U.S. PATENT DOCUMENTS

| | | | |
|---|---|---|---|
| 6,565,972 B1 * | 5/2003 | Pellerin et al. | 428/398 |
| 7,506,391 B2 * | 3/2009 | Yu | B60R 21/235 |
| | | | 428/36.1 |
| 7,560,061 B2 * | 7/2009 | Yu | D01F 6/60 |
| | | | 264/210.7 |
| 2005/0089654 A1 * | 4/2005 | Yu | B60R 21/235 |
| | | | 428/34.1 |
| 2005/0142969 A1 * | 6/2005 | Yu | D01F 6/60 |
| | | | 442/181 |
| 2006/0083874 A1 * | 4/2006 | Yu | B60R 21/235 |
| | | | 428/34.1 |
| 2012/0289114 A1 * | 11/2012 | Kim | D01D 10/02 |
| | | | 442/182 |

FOREIGN PATENT DOCUMENTS

| | | |
|---|---|---|
| JP | 2011-168919 | 9/2011 |
| JP | 2011-168938 | 9/2011 |

OTHER PUBLICATIONS

Office Action from corresponding EP Application No. 11 876 976.9 dated Apr. 1, 2016.

\* cited by examiner a INTERLACED PART
b NON-INTERLACED PA[RT]

(a)

(b)

(c)

(d)

SYNTHETIC FIBER USED FOR FABRIC

TECHNICAL FIELD

The present invention relates to a synthetic fiber for improving the uniformity of a fabric obtained by high-density high-speed weaving. In particular, the present invention relates to a synthetic fiber used for improving the air permeability uniformity of a fabric for use in an airbag.

BACKGROUND ART

Synthetic fiber is used in various materials by weaving a high-density fabric. Among others, an airbag application is important.

An airbag module is a safety device for restraining an occupant in a collision of a vehicle, and consists of a collision sensor, an inflator as a gas generator, and an airbag. The airbag is formed of a synthetic fiber fabric and withstands heat in a reaction of a propellant of the inflator, deploying in several tens of milliseconds, and absorbing the thrusting energy of the occupant with the inflation gas of the deployed bag.

The airbag must have mechanical properties high enough to not rupture during deployment or thrusting of the occupant, and physical properties satisfying the necessary mechanical properties are designed by a high-density fabric. The uniformity of the weave density of a fabric is a factor supporting the uniformity of mechanical properties, and there is a demand to enhance the uniformity of the weave density.

Also, the airbag needs to be deployed in a moment by gas and is preferably non-air-permeable as much as possible, and a coated fabric provided with a coating film of a resin or an elastomer is used, or a non-coated fabric made to be low air-permeable by high-density weaving is used. The uniformity of air permeability of the fabric leads to the uniformity of action properties of the airbag. Furthermore, at the instantaneous deployment by gas, local gas permeation due to an air permeability unevenness results in local concentration of a deployment stress, giving rise to a rupture of the airbag, and therefore, there is a demand to enhance the uniformity of the air permeability.

In the high-speed weaving of a high-density fabric, very severe friction occurs between a warp yarn and a reed or a heddle when feeding a warp yarn to a loom, and the warp yarn may be disentangled and substantially fail in forming a sufficient opening, as a result, a weft yarn is not smoothly inserted, producing a fabric defect or stopping the loom. To avoid such a problem, it is known to prevent disentanglement of the warp yarn by sizing the warp yarn or converging warp yarns with an oil/fat material or by air interlacing.

Patent Document 1 below discloses a technique of improving the weavability by improving the entanglement of the weft yarn. However, there is a problem that the physical properties of the fabric cannot be uniformly maintained at the time of high-speed weaving a high-density fabric. That is, with respect to weft insertion in a high-speed shuttleless loom, the loom can be prevented from stopping by making the weft yarn entering from the nozzle side to arrive at the side opposite the nozzle, but with respect to the weft traveling property, the arrival speed is extremely varied and there arises a problem that the uniformity of the fabric property is impaired.

Recently, in airbag applications, development is being made with an attempt to reduce the weight of a fabric by using a yarn of synthetic fiber having small fineness and high tenacity, but smaller fineness requires higher density and for realizing this, weaving at a higher speed is demanded. Also, it has been difficult to ensure the uniformity of air permeability in a non-coated fabric made to be low air-permeable by high-density weaving. In the airbag application, for directly linking the uniformity of weave density or the uniformity of air permeability to the airbag performance, it is required for a synthetic fiber having smaller fineness and higher tenacity to improve the uniformity of physical properties of a fabric woven in high-speed weaving.

RELATED ART

Patent Document

Patent Document 1: Japanese Unexamined Patent Publication (Kokai) No. 2007-126796

SUMMARY OF THE INVENTION

Problems to be Solved by the Invention

An object of the present invention is to provide a synthetic fiber suitable for high-density high-speed weaving, in particular, to provide a synthetic fiber excellent in the weft insertion stability so as to obtain a fabric uniform in the physical properties such as weave density and air permeability.

Means to Solve the Problems

As a result of many intensive studies to attain the above-described object, the present inventors have found that by using a synthetic fiber having specific physical properties, the weft insertion stability in high-speed weaving is improved and uniform physical properties of a fabric are obtained. The present invention has been accomplished based on this finding. That is, the present invention is as follows.

(1) A synthetic fiber characterized in that the fineness is from 200 to 720 dtex, the average value of the middle load modulus is from more than 75 cN/dtex to less than 150 cN/dtex, and the variation coefficient of the middle load modulus is 5% or less.

(2) The synthetic fiber according to (1) above, wherein the average value of the middle load modulus is from more than 80 cN/dtex to less than 120 cN/dtex.

(3) The synthetic fiber according to (1) or (2) above, wherein the average value of the middle elastic elongation is from 10 to 12%.

(4) The synthetic fiber according to any one of (1) to (3) above, wherein the number of filaments is from 65 to 200.

(5) The synthetic fiber according to any one of (1) to (4) above, wherein the average value of the non-interlaced part length is from 10 to 65 mm.

(6) The synthetic fiber according to (5) above, wherein the average value of the interlaced part length is 20 mm or less and the variation coefficient of the non-interlaced part length is 30% or less.

(7) The synthetic fiber according to any one of (1) to (6) above, wherein the shrinkage in boiling water is 5.5% or more.

(8) The synthetic fiber according to (7) above, wherein the shrinkage in boiling water is 7.0% or more.

(9) The synthetic fiber according to any one of (1) to (8) above, wherein the tensile strength is 8.5 cN/dtex or more.

(10) The synthetic fiber according to any one of (1) to (9) above, wherein the synthetic fiber is a polyamide fiber.

(11) The synthetic fiber according to any one of (1) to (10) above, wherein a filament spun out of a spinneret is subjected to multistage drawing consisting of cold drawing and hot drawing and then to multistage temperature-drop heat fixation.

(12) The synthetic fiber according to any one of (1) to (11) above, which is used for an airbag fabric.

(13) An airbag base fabric comprising the synthetic fiber according to any one of (1) to (11) above.

(14) An airbag comprising the airbag base fabric according to (13) above.

Effects of the Invention

The synthetic fiber of the present invention is excellent in high-speed weavability, particularly excellent in the weft insertion stability, and ensures that when formed into a high-density fabric, the weave density uniformity and the air permeability uniformity are excellent. Furthermore, a fabric obtained from the synthetic fiber of the present invention is excellent in the weave density uniformity and air permeability uniformity as an airbag fabric, so that a uniform airbag can be obtained and a highly reliable airbag free from bag burst can be obtained.

MODE FOR CARRYING OUT THE INVENTION

Figure 1:
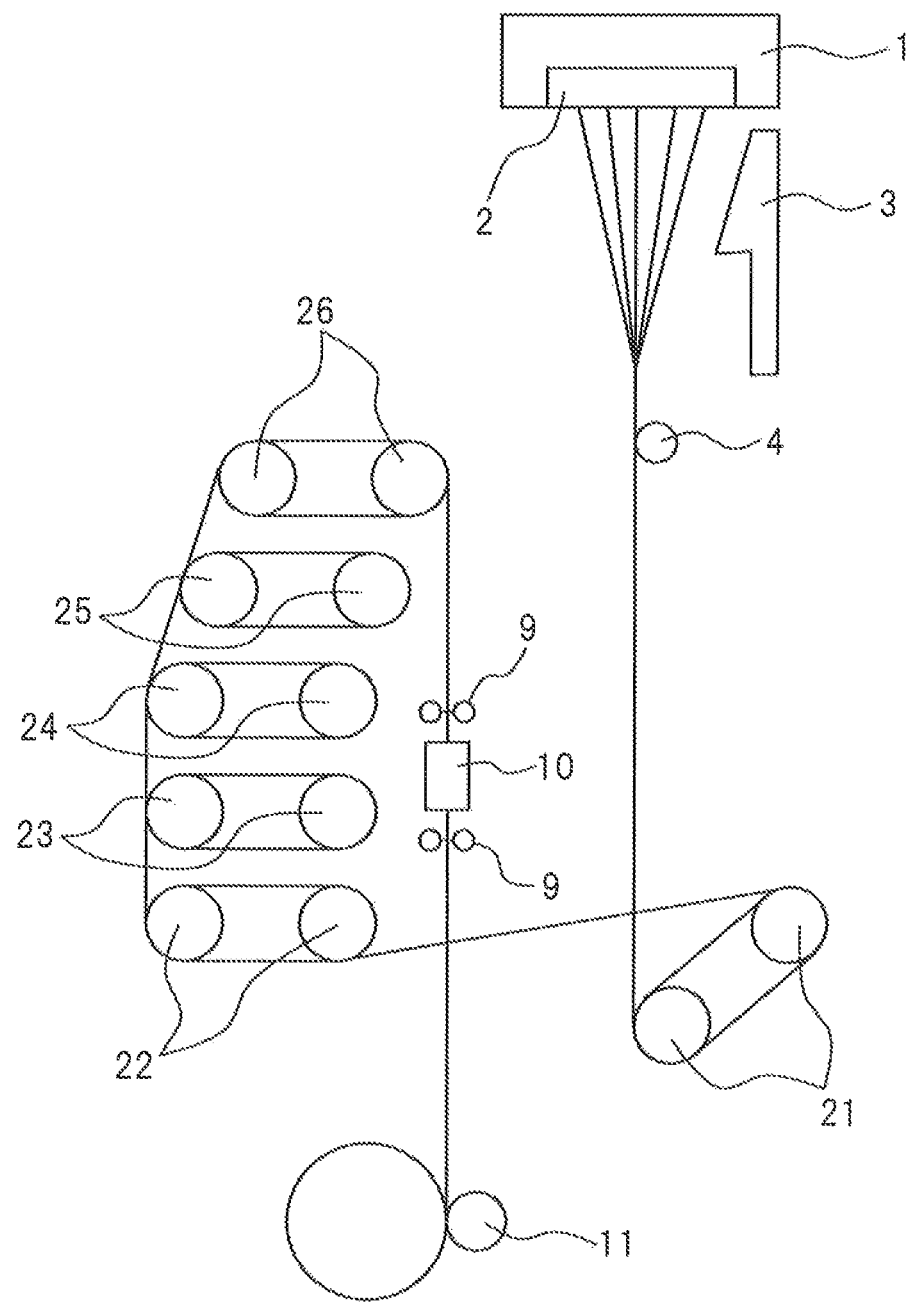
FIG. 1 A view illustrating one example of the apparatus for producing the synthetic fiber of the present invention.

The present invention is described below.

The synthetic fiber of the present invention is preferably a long fiber composed of a polyamide or polyester multifilament. In particular, a polyamide fiber is preferred and because of its high melting point and large heat capacity, the airbag when caused to deploy by an propellant exhibits excellent burst resistance due to melting resistance. Examples thereof include a fiber composed of polyamide 6, polyamide 6•6, polyamide 11, polyamide 12, polyamide 6•10, polyamide 6•12, polyamide 4•6, a copolymer thereof, and a mixture thereof. Among others, a polyamide 6•6 fiber composed of mainly a polyhexamethylene adipamide fiber is preferred. The polyhexamethylene adipamide fiber indicates a polyamide fiber consisting of 100% of hexamethylenediamine and adipic acid and having a melting point of 250° C. or more. The polyamide 6•6 fiber for use in the present invention may be a fiber composed of a polymer obtained by copolymerizing or blending polyamide 6, polyamide 6•I, polyamide 6•10, polyamide 6•T or the like with polyhexamethylene adipamide within the range keeping the melting point from becoming less than 250° C.

In the present invention, the fineness of the synthetic fiber is from 200 to 720 dtex. When the fineness is 200 dtex or more, a fabric for industrial application, which is formed from the synthetic fiber, has sufficient mechanical properties, and when the fineness is 720 dtex or less, the weft insertion during high-speed weaving at 800 rpm or more in a shuttleless loom is prevented from failing in following the weaving due to an excessively large carrying weight. The lower limit is preferably 220 dtex or more, and the upper limit is preferably 500 dtex or less, more preferably 450 dtex or less.

In the present invention, physical properties in the tensile test of the fiber are important. From the "load-elongation" curve obtained in the tensile test of the fiber, the tensile elasticity is determined based on the description of the measurement method of JIS L1017 (7.8 Initial Tensile Resistance). In JIS L1017, the tensile elasticity in the tensile initial stage is determined, but when the tensile elasticity is determined not only in the tensile initial stage of the tensile test but also in all elongation regions from the tensile initial stage to a break, the "tensile elasticity-elongation" curve can be obtained. This curve usually shows a behavior of displaying a small maximum in the tensile initial stage, then displaying a maximum value of tensile elasticity in the middle elongation region, and thereafter, decreasing in the elastic value to reach a break. The average value of the middle load modulus of the synthetic fiber of the present invention is from more than 75 cN/dtex to less than 150 cN/dtex. The middle load modulus (cN/dtex) is a maximum value of the tensile elasticity in the "tensile elasticity-elongation" curve. When the middle load modulus is high, good response of the fiber for high-speed weft insertion and a short arrival time of the weft insertion are obtained. That is, the high-speed weavability is excellent. When the arrival time of a weft yarn to the side opposite the nozzle in a loom is evaluated by the crank angle that is the timing of operation of the loom, as the middle load modulus is higher, arrival at a smaller crank angle is observed. When the crank angle is small, the weft insertion can be judged as successfully following the high-speed weaving. That is, a high middle load modulus contributes to reducing the crank angle during weaving. When the average value of the middle load modulus exceeds 75 cN/dtex, this contributes to the reduction to a smaller crank angle. The middle load modulus preferably exceeds 80 cN/dtex, and most preferably exceeds 85 cN/dtex. On the other hand, in consideration of other properties, production cost and the like, the average value of the middle load modulus is preferably less than 150 cN/dtex in the synthetic fiber. For obtaining a higher-quality fiber, the average value of the middle load modulus is more preferably less than 120 cN/dtex.

In the present invention, the variation coefficient of the middle load modulus determined by the later-described method is preferably 5% or less. When the arrival time of a weft yarn to the side opposite the nozzle in a loom is evaluated by the crank angle that is the timing of operation of the loom, as the variation coefficient of the middle load modulus is smaller, the arrival time of a weft yarn to the side opposite the nozzle is less varied and the fluctuation in the value of the crank angle is reduced. The middle load modulus preferably shows no variation. When the arrival time of a weft yarn to the side opposite the nozzle is not varied, the weft yarn is shot under uniform insertion conditions.

The weft yarn is conveyed and shot by a water droplet flow in a waterjet loom and by a pneumatic air flow in an airjet loom, and the weft yarn travels. When such conveyance and shooting are performed, the weft yarn runs to arrive at the side opposite nozzle while extending upon instantaneous shooting, crosses a warp yarn and is beaten, thereby making up a fabric. At this time, the fluctuation of the middle load modulus leads to a difference of the extension degree of the weft yarn during weft insertion and in turn to a difference of the cloth width of the fabric after weaving, as a result, a weave density difference or an air permeability difference may be produced through the processing after the weaving. As the variation coefficient of the middle load modulus is smaller in the range of 5% or less, the weave density unevenness or air permeability unevenness is reduced. The variation coefficient is preferably 3% or less. As the average value of the middle load modulus is higher, the effect of the variation coefficient of the middle load modulus on the uniformity of physical properties of the fabric is greater, and therefore, in a synthetic fiber increased in the middle load modulus, it is effective for the uniformity of physical properties of the fabric to reduce the variation coefficient of the middle load modulus more than ever. By reducing the variation coefficient of the middle load modulus, the air permeability unevenness in the fabric is reduced, making it possible to avoid a problem that a gas leak is concentrated on a relatively high-permeable site during deployment by a high-pressure gas, and bag burst results. In consideration of other properties, production cost and the like, the variation coefficient of the middle load modulus of the synthetic fiber is substantially 0.1% or more.

In the present invention, the average value of the elongation when the tensile elasticity shows a maximum value, i.e., the middle elastic elongation, is preferably from 10 to 12%. In addition to the above-described high average value of the middle load modulus, when the average value of the middle elastic elongation is small, good response of the fiber for high-speed weft insertion and a short arrival time of the weft insertion are obtained. That is, the high-speed weavability is excellent. When the arrival time of a weft yarn to the side opposite the nozzle in a loom is evaluated by the crank angle that is the timing of operation of the loom, as the average value of the middle elastic elongation is 12% or less, arrival at a smaller crank angle is observed. When the crank angle is small, the weft insertion can be judged as successfully following the high-speed weaving. The value of the middle elastic elongation is more preferably less than 11.5%. In consideration of other properties, production cost and the like, the average value of the middle elastic elongation is in substance preferably 10% or more in the synthetic fiber. For obtaining a higher-quality fiber, the average value of the middle elastic elongation is more preferably 10.5% or more.

The number of filaments in the synthetic fiber of the present invention is preferably from 65 to 200. When the number of filaments is 65 or more, the carrying efficiency by the fluid friction on the filament surface with the weft carrying flow of a water droplet flow or an air flow is high, and the weft insertion speed is high. That is, the crank angle is small and the following to high-speed weaving is facilitated. The number of filaments is more preferably 70 or more, still more preferably 80 or more. When the number of filaments is 200 or less, good energy utilization is achieved in the air interlacing for imparting interlace to the multifilament, and uniform and good interlace is advantageously imparted. The number of filaments is more preferably 150 or less.

In the present invention, it is preferred that the average value of the interlaced part length is 20 mm or less, the average value of the non-interlaced part length is from 10 to 65 mm, and the variation coefficient of the non-interlaced part length is 30% or less.

As for the interlace of the synthetic fiber of the present invention, the interlaced part length as measured by a water laying method is preferably 20 mm or less and 2 mm or more. When the interlaced part length is 20 mm or less, at the time of performing weft insertion, a weaving trouble due to poor inclusion of water or air in the weft carrying flow, i.e., water droplet flow or air flow, or shortage of traveling is not easily induced. The interlaced part length is more preferably 10 mm or less, still more preferably 5 mm or less. When the interlaced part length is 2 mm or more, the entanglement required of the warp yarn is satisfied. The non-interlaced part length is preferably 10 mm or more and 65 mm or less. When the non-interlaced part length is 10 mm or more, at the time of performing weft insertion, a weaving trouble due to poor inclusion of water or air in the weft carrying flow, i.e., water droplet flow or air flow, or shortage of traveling is scarcely induced. The non-interlaced part length is more preferably 30 mm or more. When the non-interlaced part length is 65 mm or less, it does not occur to promote yarn breaking or generation of broken filaments in yarn during weaving due to variation of the single filament length in the length direction of the yarn. Furthermore, the apparent weft cross-section is prevented from becoming too large due to filaments spread of the weft yarn mounting on a water droplet flow or an air flow and in turn, the weft traveling time is prevented from varying due to interference with a warp yarn offering an opening. The non-interlaced part length is more preferably 60 mm or less. The variation coefficient of the non-interlaced part length as determined by the later-described method is preferably 30% or less. When the variation coefficient of the non-interlaced part length is 30% or less, disentanglement or slackening of the filaments is prevented from increasing during the weaving to stop the loom or produce a fabric defect.

The shrinkage in boiling water of the synthetic fiber of the present invention is preferably 5.5% or more. When the shrinkage in boiling water is 5.5% or more, this can contribute to shrinking the fabric in the processing step after weaving and providing a high-density finish to the fabric. The shrinkage in boiling water of the synthetic fiber of the present invention is more preferably 7.0% or more. When the shrinkage in boiling water is 7.0% or more, this can contribute to shrinking the fabric in the processing step after weaving and eliminating the variation of the mechanical properties of the fabric. The shrinkage in boiling water is still more preferably 7.5% or more. In consideration of other properties, production cost and the like, the shrinkage in boiling water of a high-tenacity synthetic fiber is in substance preferably 13.0% or less, more preferably 12.0% or less, still more preferably 11.0% or less.

The adhesion ratio of the spin finish to the synthetic fiber of the present invention is preferably from 0.6 to 1.5 wt %. When the adhesion ratio is 1.5 wt % or less, the weft yarn hardly becomes awkward to travel due to sticking (tackiness). Also, the air or water as a weft carrying medium is substantially prevented from losing the weft carrying force due to decrease in the apparent cross-sectional area resulting from too tight converging of single filaments as compared with entanglement of single filaments by mere interlacing. That is, the crank angle is kept from becoming extremely large. On the other hand, when the adhesion ratio is 0.6 wt % or more, the weft yarn is smoothly fed thanks to an appropriate friction-decreasing effect and therefore, the crank angle does not fluctuate.

The tensile strength of the synthetic fiber of the present invention is preferably 8.5 cN/dtex or more. When the tensile strength is as high as 8.5 cN/dtex or more, this contributes to enhancing the mechanical properties of the fabric and is advantageous also in increasing the middle load modulus during spinning. The tensile strength is more preferably 9.0 cN/dtex or more, and most preferably 9.5 cN/dtex or more. In consideration of other properties, production cost and the like, the tensile strength of the synthetic fiber is 10.5 cN/dtex or less.

The method for producing the synthetic fiber of the present invention is described below. FIG. 1 is an explanatory view illustrating one example of the equipment for producing the fiber of the present invention. First, a polymer in the molten state is uniformly warmed by a part called a spin head (1) of a spinning machine and spun out from a spinneret (2). The spun-out polymer is solidified with cold wind from a cooling chamber (3) to form a fiber. The collected filaments are applied with a spin finish by an oil feed device having an oil feed roller (4) and then delivered to a drawing step by a roller group consisting of a take-up roller (21) and from first roller (22) to fifth roller (26). More specifically, the fiber is taken up by the roller (21) at a predetermined speed, guided to a first-stage roller by a slight tension force, drawn from the first stage roller (22) by multistage hot-drawing rollers (23) and (24), then passed to multistage cooling rollers (25) and (26), fed to an interlace-imparting device (10) through a yarn path regulating guide (9) and taken up by a winding machine (11).

In the present invention, the drawing step preferably uses a heat roll. Drawing temperature control using heat transfer can be satisfactorily performed by designing the contact length between the roll and the yarn. In the multistage drawing suitable for the present invention, first, cold drawing in the first stage is performed. In the cold drawing between the first-stage roller (22) and the second-stage roller (23), the first-stage drawing is preferably performed by setting the temperature to less than 150° C. and drawing the fiber in an allocation ratio such that the first-stage draw ratio becomes from 25 to 55% based on the total draw ratio. The ratio is more preferably from 30 to 50%, more preferably from 35 to 45%. The draw ratio in the first stage may be, for example, less than 3 times, preferably 2.8 times or less, more preferably 2.5 times or less. By keeping low the allocation of the first-stage draw ratio based on the total draw ratio and increasing the allocation of the draw ratio in the second state, fiber physical properties of higher tenacity and suppressed middle elastic elongation can be stably developed. Also, the drawing step of a high-tenacity fiber having a high heat shrinkage percentage can be stably performed. The 1.5 cold drawing in the first stage may be performed by multistage drawing, and the fiber may be drawn by sequentially raising the drawing temperature in the temperature setting of less than 150° C. In the cold drawing of the first stage, the temperature of the cold drawing roll (in the example of the figure, the first-stage roller) is preferably set between the anhydrous glass transition temperature of the spun-out fiber and a temperature lower by about 60° C. than the anhydrous glass transition temperature, so as to fix the position of the drawing start point. For example, the roller temperature setting in the first-stage drawing is from 20 to 90° C., preferably from more than 50° C. to 80° C., more preferably from over 60° C. to 70° C. Subsequently, the set temperature may be raised to less than 150° C. at a maximum, preferably, the temperature may be sequentially raised to 120° C., thereby performing multistage drawing. Hot drawing in the second stage is performed between the second-stage roller (23) and the third-stage roller (24), and the fiber is drawn by setting the second-stage roller to 150° C. or more until reaching the total draw ratio. The hot drawing in the second stage may be performed by multistage drawing, and the fiber may be drawn while sequentially raising the drawing temperature in the temperature setting of 150° C. or more. The total draw ratio may be set to develop the desired tensile strength property. For example, the total draw ratio is approximately from 5 to 6 times. In the hot drawing of the second stage, drawing is preferably performed at a drawing roll temperature of 150° C. or more by setting the maximum temperature to a temperature lower by about 30° C. than the fixed-length confining melting point of the drawn yarn, and for high drawing, the temperature is preferably as high as possible. For example, the temperature of the hot drawing roll (in the example of the figure, second-stage roller) is preferably from 180 to 240° C., more preferably from 200 to 220° C. Subsequently, the set temperature may be raised to 240° C., preferably, the temperature may be sequentially raised to 230° C., thereby performing multistage drawing.

Stable drawing by the allocation such that the first-stage draw ratio becomes from 25 to 55% based on the total draw ratio may be achieved by increasing the surface roughness of the first drawing roll of the second-stage roll to slide the drawn filament on the drawing roll. The surface roughness is, in terms of Ra, preferably 2.0 μm or more, more preferably from 2.0 to 5.0 μm, still more preferably from 3.0 to 5.0 μm.

The rollers after the hot drawing belong to a heat fixation step, and the present invention is characterized in that the fiber is taken up by heat-fixing the polymer orientation structure while sequentially lowering the temperature in a multistage fashion. In the example of FIG. 1, hot drawing until the third-stage roller (24) is completed, and heat fixation is performed in three stages by using from third-stage roller (24) to fifth-stage roller (26) until the winding. The temperature of the third-stage roller (24) is a temperature starting the heat fixation step and is a maximum temperature in the heat fixation step. The temperature of the third-stage roller (24) is preferably from +30° C. to −50° C. of the final hot drawing temperature, i.e., the temperature of the second-stage roller (23), and the maximum temperature of the third-stage roller (24) is a temperature lower by about 30° C. than the fixed-length confining melting point of the drawn fiber. The fourth-stage roller is set to a lower temperature than the third-stage roller, and the temperature difference therebetween is preferably from 10 to 60° C., more preferably from 20 to 50° C., still more preferably from 30 to 40° C. The fifth-stage roller is set to a temperature of less than 150° C., by further lowering the temperature, preferably set to be from 140 to 100° C., and the temperature difference from the fourth-stage roller is preferably from 10 to 60° C., more preferably from 20 to 50° C., still more preferably from 30 to 40° C. In this way, the present invention is characterized by performing, in the heat fixation step, multistage temperature-drop heat fixation of lowering the temperature in at least two stages, preferably three or more stages. Subsequently, the fiber is taken up by the winding machine (11). Appropriate relaxation is effected between the third-stage roller (24) and the fifth-stage roller (26), but the ratio of respective roller speeds is preferably from 1.0 to 0.90, more preferably from 1.0 to 0.94. The entire relaxation rate ratio in the heat fixation step is preferably from 1.0 to 0.90. In this way, the tension is maintained by setting the relaxation rate ratio as high as possible and in the heat fixation step, the orientation structure is maintained as much as possible, whereby the middle load modulus can be increased and furthermore, the middle elastic elongation can be kept low.

Also, after the completion of hot drawing, when the temperature of the third-stage roller (24) is set to a low temperature relative to the hot drawing temperature until the second-stage roller (23), as the temperature is set lower, the shrinkage in boiling water can be more increased. In this way, by performing heat fixation while sequentially lowering the temperature in a multistage fashion, heat shrinkage of the fiber can be stabilized to reduce the variation coefficient of the middle load modulus and at the same time, fiber physical properties of high middle load modulus and low middle elastic elongation can be obtained. A relaxation treatment at a rate ratio of 1.0 to 0.85 can be performed also between the fifth-stage roller (26) (final roller) and the winding machine. On the other hand, when the temperature of the fifth-stage roller (26) (final roller) is set to a low temperature, the interlace imparting efficiency can be increased by keeping low the take-up tension between the roll and the winding machine (11) and the interlace uniformity can be also improved by eliminating the variation of the tension. The temperature of the final roller is preferably 150° C. or less and down to room temperature (non-heating), more preferably 140° C. or less and down to 80° C.

The spin finish applied by the oil feed device is not particularly limited, but those having excellent smoothness to enable smooth drawing of a fiber in the fiber-making process and at the same time, having heat resistance are preferred in view of fiber quality and application in industrial materials. As to the composition of the spin finish satisfying such properties, for example, a spin finish containing, as the main component, a divalent fatty acid ester compound, an alkylene oxide-containing divalent fatty acid ester compound, a polyhydric alcohol alkylene oxide adduct, an alkylene oxide-containing polyhydric alcohol alkylene oxide adduct, or the like is preferably used. The spin finish may be applied as a diluted solution with mineral oil or an aqueous emulsion, and method for applying the spin finish is not particularly limited. In consideration of compatibility with water in the post-process, the spin finish is preferably the emulsion. The spin finish can be appropriately applied in an application ratio of 0.6 to 1.5 wt %. For increasing the weft traveling property, the application ratio may be also set to be from 0.6 to 1.0 wt % so as to avoid sticking by the spin finish.

A yarn path regulating guide (9) for stabilizing the yarn travel is provide upstream and downstream the interlace imparting device (10). It is preferred for obtaining a uniform interlaced fiber to keep the yarn travel angle defined by these guides and the interlace nozzle part of the interlace imparting device to fall in the range of 1 to 10°. As the interlace imparting device, a known device of jetting a compressed fluid onto the filaments through an interlace nozzle may be used. The compressed fluid sprayed on the filaments is preferably fed with an energy of 0.5 to 3.5 kW.

The compressed fluid energy is preferably 0.5 kW or more so as to avoid a too long non-interlace length, and variation of the non-interlace length can be also suppressed. When the compressed fluid energy is increased, the non-interlace length becomes short. The compressed fluid energy is preferably 3.5 kW or less so as to avoid a too short non-interlace length. Also, keeping the compressed fluid energy from becoming too high leads to suppressing the variation of the non-interlace length.

The feed energy of the compressed fluid can be calculated by the product of the feed pressure (MPa) and the flow rate used (Nm$^3$/hr), and by arbitrarily selecting the feed pressure and the fluid inlet diameter of the interlace nozzle, the feed energy in the range above can be satisfied.

In the multistage heat fixation method of the present invention, the take-up tension between the fifth-stage roller (26) (final roller) and the winding machine (11) is less varied and is stabilized. Furthermore, when the take-up tension between the fifth-stage roller (26) (final roller) and the winding machine (11) is adjusted to fall in the range of 0.1 to 0.3 cN/dtex, the interlaced fiber of the present invention can have a stable interlaced part reduced in variation, particularly, variation of the non-interlace length. At the same time, the variation of the tension at the unreeling of the package can be minimized, and the package unreeling property is also excellent.

The synthetic fiber of the present invention can be woven into a fabric by various looms such as waterjet loom, airjet loom, rapier loom and multiphase weaving machine and among others, is suitable for high-speed weaving at 800 rpm or more.

After the weaving, the oil may be removed in a scouring step, or the scouring step may be omitted. The fabric may be subjected to a warm water or hot air treatment and thereby shrunk. In this shrinking step, the tension in the width direction or cloth length direction of the fabric may be controlled, or the dimensional change ratio may be adjusted. The control of the tension or the control of the dimensional change ratio in the width direction of the fabric is uniformly exerted throughout the cloth length and therefore, relaxation of the non-uniformity of fabric physical properties attributable to the variation of the middle load modulus during weft insertion is limited.

The synthetic fiber of the present invention is suitable for making up a high-density fabric and can be woven into a fabric having a cover factor of 2,000 to 2,500, preferably from 2,200 to 2,500. Incidentally, the cover factor is {warp density (yarns/2.54 cm)×(warp fineness (dtex))$^{1/2}$+weft density (yarns/2.54 cm)×(weft fineness (dtex))$^{1/2}$}.

The fabric using the synthetic fiber of the present invention may be woven as a high-density fabric and used for a non-coated airbag. Also, the fabric can be coated with a resin or an elastomer and used for a coated airbag.

EXAMPLES

The present invention is described in greater detail below by referring to Examples, but the present invention is not limited only to these Examples. Incidentally, the definitions and measurement methods of physical properties used in the specification and Examples are as follows.
(1) Fineness, Tensile Strength These were measured according to JIS L 1017 7.3 and 7.5. The tensile strength is a value determined by twisting the sample to have 8 twists/10 cm and measuring the sample under the conditions of a gauge length of 250 mm and a tensile speed of 300 mm/min.
(2) Middle Load Modulus, Variation Coefficient of Middle Load Modulus, Middle Elastic Elongation These were determined from the load-elongation curve shown in FIG. 5 obtained by applying the initial tensile resistance described in the item 7.8 of JIS L 1017. In the item 7.8, a tensile resistance is determined from the maximum point at the tangential angle near the original point of the load-elongation curve and defined as the initial tensile resistance, but in the present invention, instead, the tensile resistance is determined from the maximum point C at the tangential angle observed substantially in the middle between the original point and the breaking load and defined as the middle load modulus R. That is, the middle load modulus R is represented by the following formula:

$$R=F/(L'/L\times d)$$

wherein F is the load (cN) at the point C, L is the sample length, L' is the length (T–H) between the intersection H of the perpendicular line drawn from the point C with the elongation axis and the intersection T of the tangent line with the elongation axis, and d is the fineness (dtex). Also, the elongation H at the maximum point C at the tangential angle is defined as the middle elastic elongation.

The variation coefficient CV of the middle load modulus is represented by the following formula. A higher CV value indicates a greater variation.

$$CV(\%)=(s/X)\times100$$

wherein s is the standard deviation, and X is the average value. The average value and variation coefficient of the middle load modulus were obtained by arbitrarily sampling 50 samples in the fiber length direction of the wound fiber, determining the middle load modulus on each sample by the method above, and calculating the average value and the standard deviation.

(3) Interlaced Part Length, Non-Interlaced Part Length

Figure 4:
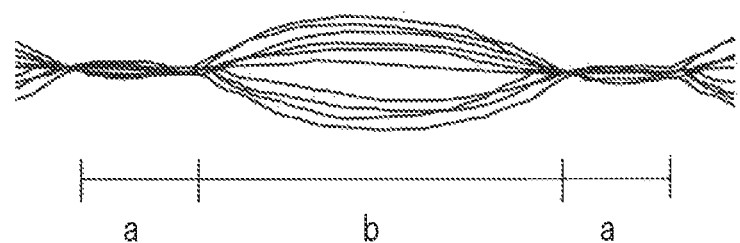
FIG. 4 A view illustrating the interlaced part and the non-interlaced part when a fiber is put into water.

The water bath for the measurement of the number of interlaces has a length of 1.0 m, a width of 20 cm and a height (water depth) of 15 cm, and water fed from the feed port is discharged by overflowing from the bath. That is, fresh water is always fed at a flow rate of about 500 cc/min, whereby water in the measurement bath is renewed. At the time of measuring the number of interlaces of the filaments by a water laying method, as shown in FIG. 4, the length a of the interlaced part of the filaments spread on the water surface and the length b of the non-interlaced part are measured by a scale. These measurements were repeated 25 times, and the average value was determined.

(4) Coefficient Variation CV of Non-Interlaced Part Length

The coefficient variation CV of non-interlaced part length was determined by the following calculation from the non-interlaced part length measured in the item (3) above. A higher CV value indicates a greater variation.

$$CV(\%)=(s/X)\times100$$

wherein s is the standard deviation, and X is the average value.

(5) Shrinkage in Boiling Water

This was measured in accordance with JIS L 1017 8.14.

(6) Adhesion Ratio of Spin Finish

This was measured in accordance with JIS L 1017 7.1.6.

(7) Evaluation of Weaving

A plain fabric was woven at a speed of 900 rpm by an air jet loom, Type AS (AWS4/J280), manufactured by DORNIER, and the arrival timing to the side opposite the nozzle in the weft insertion is detected by the crank angle that is the timing of operation of the loom. As for the crank angle, the average value and the variation coefficient CV were determined from the data of 54,000 weft shootings. The variation coefficient CV was calculated by the following formula.

$$CV(\%)=(s/X)\times100$$

wherein s is the standard deviation, and X is the average value.

Also, with respect to the loom stop during weaving, the loom stop caused by a defect relevant to the entanglement of warp yarns was discriminated from the loom stop caused by a defect relevant to the weft traveling property, and the frequency (times/loom/day) of loom stop caused by the weft yarn was evaluated according to the following criteria:

A: Loom stop at 3 times/loom/day or less.
B: Loom stop at 10 times/loom/day or less.
C: Loom stop at more than 10 times/loom/day.

(8) Evaluation of Air Permeability

Using Capillary Flow Porometer (CFP-1200AEX) manufactured by Porous Materials, Inc., the air permeability under 100 kPa was determined by sampling a measurement sample having a diameter of 25 mm from the fabric and drawing a wet-up/dry-up air permeation curve from an air pressure of 0 to an air pressure of 200 kPa with the immersion solution GalWick. From the measurement of samples at arbitrarily selected 10 portions, the variation coefficient CV value was determined by the following formula.

$$CV(\%)=(s/X)\times100$$

wherein s is the standard deviation, and X is the average value.

(9) Evaluation of Inflation Pressure of Airbag

Figure 6:
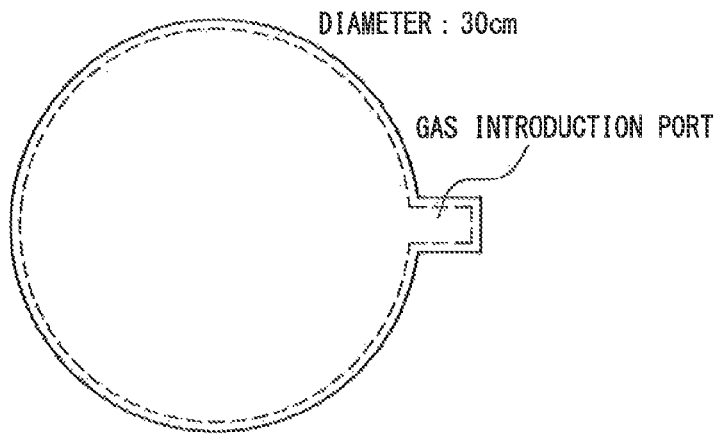
FIG. 6 A view illustrating the circular model airbag used in Examples.
Figure 6:
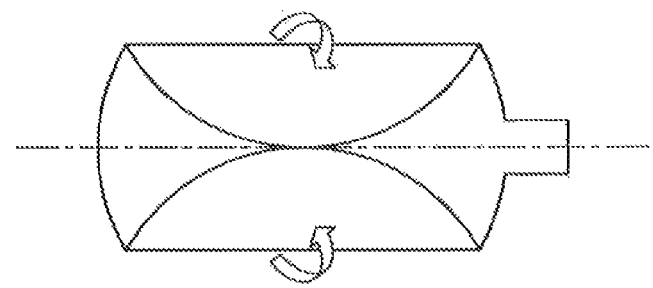
Figure 6:
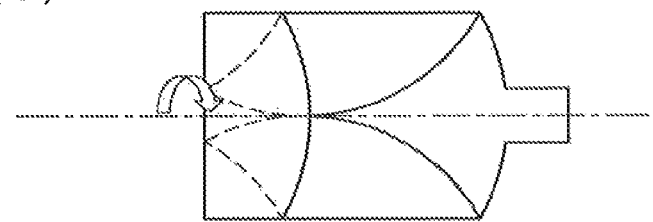
Figure 6:
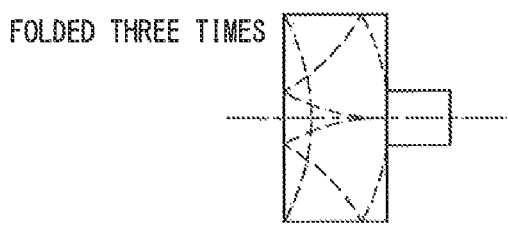

The fabric was cut in a circular shape capable ensuring an inflation size of 30 cm in diameter, and a model airbag shown in FIG. 6(a) was sewn in the form of laying one sheet of the fabric on top of another sheet. As shown in FIG. 6(a), a gas introduction port of 100 mm×80 mm was provided in the airbag, and the introduction port was used for a cylindrical gas jetting port and hermetically bound to inhibit gas leak.

Air at 900 L/min was introduced from the gas jetting port, and by measuring the inflation pressure (kPa), the gas leak during inflation was evaluated.

(10) Evaluation of Burst of Airbag

With respect to the same model airbag as that in the item above, as shown in FIGS. 6(b) to 6(d), the model airbag horizontally spreading in a semicircle around the gas introduction port was folded toward the center by keeping the folds from overlapping with each other and thereafter, folded three times at intervals of 10 cm from the side opposite the gas introduction port toward the introduction port side.

The evaluation of deployment was performed 10 times by using a high-pressure compressed helium gas at a 970 cc tank pressure of 15 MPa and by inspecting the outer appearance of the airbag, the burst resistance was evaluated according to the following criteria.

A: Neither burst (bag rupture) nor seam opening occurred.
B: No burst but seam opening occurred in one or more bags.
C: Burst occurred in one or more bags.

(11) Surface Roughness

This is a value measured using a surface roughness meter (Surfcorder SE-40D, manufactured by Kosaka Laboratory Ltd.) in accordance with the standards for the contact needle surface roughness measurement of JIS B0651, and the centerline average roughness (Ra) was measured.

Example 1

By using the apparatus shown in FIG. 1, a nylon 66 polymer having a 90% formic acid relative viscosity of 80 obtained by a conventional polymerization method was melted at 300° C., subjected to temperature equalization by a spin head (1), extruded from a spinneret (2) having a number of holes of 72, and taken up by a direct spinning drawing process, whereby a polyamide 66 fiber of 470 dtex and 72 filaments was produced. More specifically, the extruded nylon 66 polymer was cooled and solidified in a cold air chamber (3) to form a fiber, and the fiber was passed sequentially through an oil feed roller (4), a take-up roller (21) and from a first roller (22) to a fifth roller (26). After stabilizing the yarn travel with a yarn path regulating guide (9), interlace was imparted to the filaments by an interlace-imparting device (10), and the fiber was wound up.

As for the temperature of each roller, the take-up roller (21) was set to room temperature, the first roller (22) was set to 65° C., the second roller (23) was set to 200° C., and the third roller (24) was set to 220° C. The fourth roller (25) was at 180° C., and the fifth roller (26) was at 140° C. As for the drawing allocations, a first roller/take-up roller speed ratio was set to 1.01 times so that the fiber was under tension between the take-up roller and the first roller, and the fiber was drawn to 2.25 times between the first roller and the second roller, and to 2.55 times between the second roller and the third roller. The surface roughness of the second roller was 4.0 μm. In the heat fixation, the fourth roller/third roller speed ratio was set to 1.0 times, the fifth roller/fourth roller speed ratio was set to 0.99 times, and the fiber was relaxed by setting the speed ratio from the fifth roller to the winding machine to 0.94 times and taken up. The interlace-imparting device was disposed between the fifth roller (26) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

The obtained polyamide 66 fiber was woven at a speed of 900 rpm with an air jet loom, Type AS (AWS4/J280), manufactured by DORNIER to obtain a plain woven fabric. In the weaving process, the crank angle relevant to the weft traveling property was evaluated. The crank angle was small and stable, and the evaluation results are shown together in Table 1.

The obtained fabric was continuously scoured at 80° C. and heatset by feeding the fabric by a tenter at 170° C. with an overfeed of 4% and reducing the fabric width with a neck-in amount of 1% to obtain a fabric having a warp and weft weave density of 55 yarns×55 yarns per 2.54 cm. This was used as a non-coated fabric and evaluated for the air permeation unevenness and the gas leak due to air permeation under an inflation pressure. Furthermore, the burst behavior in the deployment by a high-pressure gas was evaluated. The evaluation results are shown together in Table 1. The expansion pressure was high, the gas leak was low, the permeability unevenness was small, and the burst resistance performance was stable.

Example 2

The production and evaluation were performed in the same manner as in Example 1 except that in the heat fixation of the spinning process, the fifth roller/fourth roller speed ratio was changed to 1.00 times and the speed ratio from the fifth roller to the winding machine was changed to 0.93 times. The physical properties and the like of the obtained polyamide 66 fiber and the evaluation results and the like of the fabric are shown in Table 1.

The average value of the middle load modulus was increased, the crank angle in weaving was smaller and more stable, the permeability unevenness of the non-coated fabric was small, and the burst resistance performance was also stable.

Example 3

The production and evaluation were performed in the same manner as in Example 2, except that the pressure when applying compressed air to the interlace-imparting device in the spinning process was changed to 0.42 MPa and the air feed energy was changed to 1.04 kW. The physical properties and the like of the obtained polyamide 66 fiber and the evaluation results and the like of the fabric are shown in Table 1.

The percentage variation of the middle load modulus was slightly increased and the variation in the crank angle in weaving was slightly increased, but the permeability unevenness was small and the burst resistance performance was also stable.

Example 4

The production and evaluation were performed in the same manner as in Example 2, except that in the spinning process, spinning was performed using a spinneret having a number of holes of 140. The physical properties and the like of the obtained polyamide 66 fiber and the evaluation results and the like of the fabric are shown in Table 1.

The crank angle in weaving was small, the permeability unevenness of the non-coated fabric was also small, and the burst resistance performance was stable.

Example 5

The production and evaluation were performed in the same manner as in Example 2, except that in the spinning process, spinning was performed using a spinneret having a number of holes of 180. The physical properties and the like of the obtained polyamide 66 fiber and the evaluation results and the like of the fabric are shown in Table 1.

The crank angle in weaving was small, the permeability unevenness of the non-coated fabric was also small, and the burst resistance performance was stable.

Example 6

The production and evaluation were performed in the same manner as in Example 2, except that the pressure when applying compressed air to the interlace-imparting device in the spinning process was changed to 0.2 MPa and the air feed energy was changed to 0.53 kW. The physical properties and the like of the obtained polyamide 66 fiber and the evaluation results and the like of the fabric are shown in Table 1.

While the crank angle in weaving was slightly decreased, the number of loom stops was slightly large. The variation in the crank angle was slightly increased, but the permeability unevenness was small and the burst resistance performance was also stable.

Example 7

The production and evaluation were performed in the same manner as in Example 2, except that in the heat fixation of the spinning process, the fourth roller temperature was changed to 200° C. and the fifth roller/fourth roller speed ratio was changed to 0.99 times. The physical properties and the like of the obtained polyamide 66 fiber and the evaluation results and the like of the fabric are shown in Table 1.

The shrinkage in boiling water was decreased, the crank angle in weaving was small and stable, and although the permeability unevenness of the non-coated fabric was slightly large, the burst resistance performance was stable.

Example 8

The production and evaluation were performed in the same manner as in Example 2, except that in the spinning process, the amount of the spin finish applied by the oil feed roller was increased to 1.6%. The physical properties and the like of the obtained polyamide 66 fiber and the evaluation results and the like of the fabric are shown in Table 1.

The crank angle in weaving was slightly increased and the variation was also slightly increased, but the permeability unevenness of the non-coated fabric was small and the burst resistance performance was also stable.

Example 9

The production and evaluation were performed in the same manner as in Example 2, except that in the spinning process, spinning was performed using a spinneret having a number of holes of 60. The physical properties and the like of the obtained polyamide 66 fiber and the evaluation results and the like of the fabric are shown in Table 1.

The crank angle in weaving was increased and the variation was also slightly increased. The permeability unevenness of the non-coated fabric was slightly large, but the burst resistance performance was substantially stable.

Example 10

The production and evaluation were performed in the same manner as in Example 2, except that in the spinning process, the fineness was changed to 235 dtex and the weave density after weaving and processing became 75 yarns/2.54 cm for both the warp yarn and the weft yarn. The physical properties and the like of the obtained polyamide 66 fiber and the evaluation results and the like of the fabric are shown in Table 1.

The average value of the middle load modulus was slightly large, but the crank angle in weaving was small, the permeability unevenness of the non-coated fabric was small, and the burst resistance performance was stable.

Example 11

The production and evaluation were performed in the same manner as in Example 2, except that in the heat fixation of the spinning process, the third roller temperature was changed to 210° C., the fourth roller temperature was changed to 190° C., the fifth roller/fourth roller speed ratio was changed to 0.99 times and the speed ratio from the fifth roller to the winding machine was changed to 0.96 times. The physical properties and the like of the obtained polyamide 66 fiber and the evaluation results and the like of the fabric are shown in Table 1.

The shrinkage in boiling water was raised, the crank angle in weaving was small and stable, the permeability unevenness of the non-coated fabric was small, and the burst resistance performance was also stable.

Example 12

The production and evaluation were performed in the same manner as in Example 2, except that the pressure when applying compressed air to the interlace-imparting device in the spinning process was changed to 0.15 MPa and the air feed energy was changed to 0.29 kW. The physical properties and the like of the obtained polyamide 66 fiber and the evaluation results and the like of the fabric are shown in Table 1.

The non-interlace length was slightly increased, and the variation in the crank angle in weaving was slightly increased, affecting the variation in permeability. As for the evaluation of deployment by a high-pressure gas, the fabric had a burst resistance performance, though the reliability was slightly poor.

Example 13

By using the apparatus shown in FIG. 1, spinning was performed in the same manner as in Example 1. As for the temperature of each roller, the take-up roller (21) was set to room temperature, the first roller (22) was set to 65° C., the second roller (23) was set to 200° C., and the third roller (24) was set to 210° C. The fourth roller (25) was at 1800°, and the fifth roller (26) was at 140° C. As for the drawing allocations, a first roller/take-up roller speed ratio was set to 1.01 times so that the fiber was under tension between the take-up roller and the first roller, and the fiber was drawn to 2.15 times between the first roller and the second roller, and to 2.55 times between the second roller and the third roller. The surface roughness of the second roller was 4.0 μm. In the heat fixation, the fourth roller/third roller speed ratio was set to 1.0 times, the fifth roller/fourth roller speed ratio was set to 0.99 times, and the fiber was relaxed by setting the speed ratio from the fifth roller to the winding machine to 0.94 times and taken up. The interlace-imparting device was disposed between the fifth roller (26) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric having a weave density of 55 yarns/2.54 cm for both the warp yarn and the weft yarn. The evaluation results and the like of the obtained fabric are shown in Table 1.

The crank angle relevant to the weft traveling property was large and the variation thereof was also large, but the weavability was stable. The permeability unevenness was slightly large and as for the burst behavior in the deployment by a high-pressure gas, the fabric had a burst resistance performance, though the reliability was slightly poor.

Comparative Example 1

Figure 2:
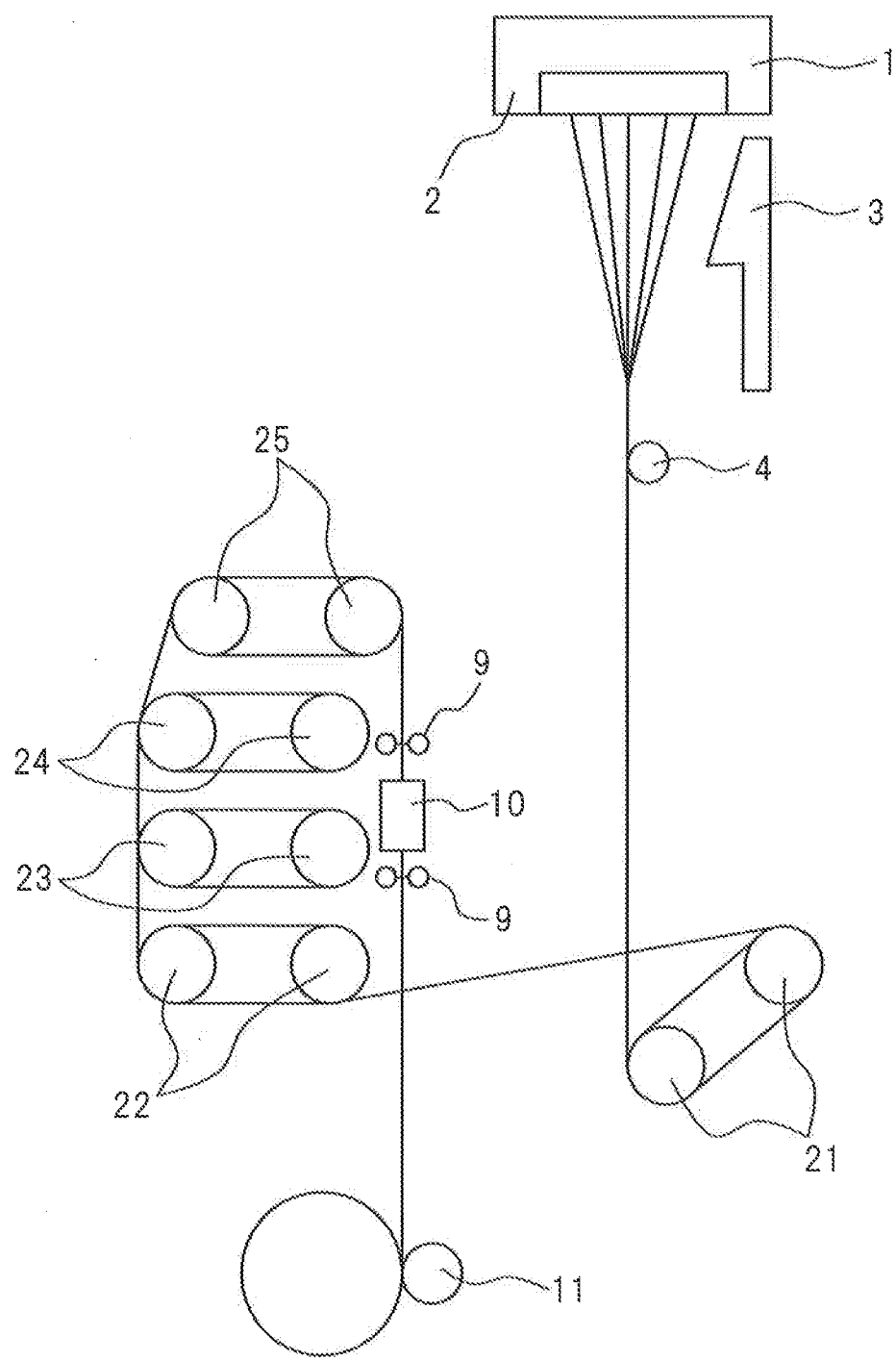
FIG. 2 A view illustrating one example of the apparatus for producing the conventional synthetic fiber.

The apparatus shown in FIG. 2 was used. A nylon 66 polymer having a 90% formic acid relative viscosity of 80 obtained by a conventional polymerization method was melted at 300° C., subjected to temperature equalization by a spin head (1), extruded from a spinneret (2) having a number of holes of 72, and taken up by a direct spinning drawing process, whereby a polyamide 66 fiber of 470 dtex and 72 filaments was produced. More specifically, the extruded nylon 66 polymer was cooled and solidified in a cold air chamber (3) to form a fiber, and the fiber was passed sequentially through an oil feed roller (4), a take-up roller (21) and from a first roller (22) to a fourth roller (25). After stabilizing the yarn travel by a yarn path regulating guide (9), interlace was imparted to the filaments by an interlace-imparting device (10), and the fiber was taken up.

As for the temperature of each roller, the take-up roller (21) was set to room temperature, the first roller (22) was set to 65° C., the second roller (23) was set to 220° C., and the third roller (24) was set to 180° C. The fourth roller (25) was at 140° C. As for the drawing allocations, a first roller/take-up roller speed ratio was set to 1.01 times so that the fiber was under tension between the take-up roller and the first roller, and the fiber was drawn to 3.55 times between the first roller and the second roller, and to 1.60 times between the second roller and the third roller. The surface roughness of the second roller was 1.5 µm. In the heat fixation, the fourth roller/third roller speed ratio was set to 1.0 times. The fiber was relaxed by setting the speed ratio from the fourth roller to the winding machine to 0.92 times and taken up. The interlace-imparting device was disposed between the fourth roller (25) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric having a weave density of 55 yarns/2.54 cm for both the warp yarn and the weft yarn. The evaluation results and the like of the obtained fabric are shown in Table 1.

Because of a large percentage of cold drawing, in the physical properties of the fiber, the average value of the middle load modulus was small, and the average value of the middle elastic elongation was large. The yarn-making process at a high draw ratio was slightly unstable, and the number of broken filaments in fiber was somewhat large. In the weaving process, the number of loom stops was slightly large. Since the average value of the middle load modulus was small, the crank angle in weaving was large, and the amount of gas leak in inflation was large. Also, because of a large percentage of cold drawing, the variation of the crank angle was large. The permeability unevenness of the non-coated fabric was large and because of the large permeability unevenness, the burst resistance performance was unstable.

Comparative Example 21

Figure 3:
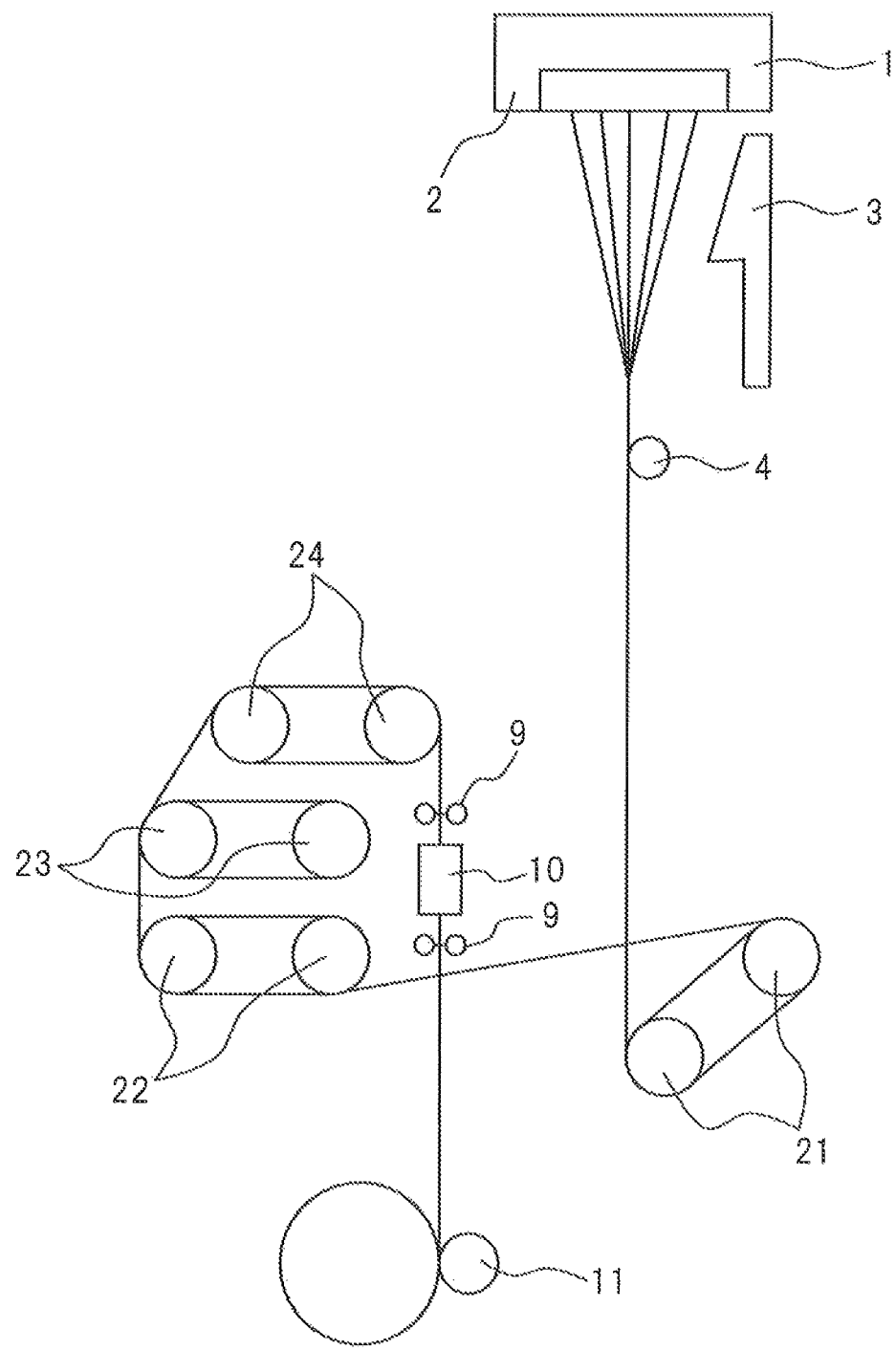
FIG. 3 A view illustrating another example of the apparatus for producing the conventional synthetic fiber.

The apparatus shown in FIG. 3 was used. A nylon 66 polymer having a 90% formic acid relative viscosity of 80 obtained by a conventional polymerization method was melted at 300° C., subjected to temperature equalization by a spin head (1), extruded from a spinneret (2) having a number of holes of 72, and taken up by a direct spinning drawing process, whereby a polyamide 66 fiber of 470 dtex and 72 filaments was produced. More specifically, the extruded nylon 66 polymer was cooled and solidified in a cold air chamber (3) to form a fiber, and the fiber was passed sequentially through an oil feed roller (4), a take-up roller (21) and from a first roller (22) to a third roller (24). After stabilizing the yarn travel by a yarn path regulating guide (9), interlace was imparted to the filaments by an interlace-imparting device (10), and the fiber was taken up.

As for the temperature of each roller, the take-up roller (21) was set to room temperature, the first roller (22) was set to 65° C., the second roller (23) was set to 220° C., and the third roller (24) was set to 180° C. As for the drawing allocations, a first roller/take-up roller speed ratio was set to 1.01 times so that the fiber was under tension between the take-up roller and the first roller, and the fiber was drawn to 3.55 times between the first roller and the second roller, and to 1.60 times between the second roller and the third roller. The surface roughness of the second roller was 1.5 µm. In the heat fixation, the third roller/winding machine speed ratio was set to 0.94 times. The interlace-imparting device was disposed between the third roller (24) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric having a weave density of 55 yarns/2.54 cm for both the warp yarn and the weft yarn. The evaluation results and the like of the obtained fabric are shown in Table 1.

Since the percentage of cold drawing was large and in addition, the heat fixation had only one relaxation step, heat fixation was performed by adjusting the relaxation speed ratio to provide a high tension, but in the physical properties of the fiber, the average value of the middle load modulus was small, and the average value of the middle elastic elongation was large. The amount of gas leak in inflation was larger. Also, because of a large percentage of cold drawing, the crank angle in weaving was large and the variation was also larger. The permeability unevenness of the non-coated fabric was larger, and the burst resistance performance was unstable.

Comparative Example 3

Similarly to Comparative Example 1, spinning was performed using the apparatus shown in FIG. 2. The take-up roller (21) was set to room temperature, the first roller (22) was set to 65° C., the second roller (23) was set to 180° C., and the third roller (24) was set to 170° C. The fourth roller (25) was at 140° C. As for the drawing allocations, a first roller/take-up roller speed ratio was set to 1.01 times so that the fiber was under tension between the take-up roller and the first roller, and the fiber was drawn to 3.55 times between the first roller and the second roller, and to 1.65 times between the second roller and the third roller. The surface roughness of the second roller was 1.5 µm. In the heat fixation, the fourth roller/third roller speed ratio was set to 1.0 times, and the fiber was relaxed by setting the speed ratio from the fourth roller to the winding machine to 0.96 times and taken up. The interlace-imparting device was disposed between the fourth roller (25) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric. The evaluation results and the like of the obtained fabric are shown in Table 1.

Heat fixation was performed by adjusting the relaxation speed ratio to provide a high tension as compared with Comparative Example 1, as a result, the average value of the middle load modulus was increased, and the average value of the middle elastic elongation was decreased. The amount of gas leak in inflation was also small. However, stabilization of tension relaxation was incomplete, and the variation of the middle load modulus was great. The crank angle in weaving was small but the variation was large. The permeability unevenness of the non-coated fabric was large, and the burst resistance performance was unstable.

Comparative Example 4

Similarly to Comparative Example 1, spinning was performed using the apparatus shown in FIG. 2. The take-up roller (21) was set to room temperature, the first roller (22) was set to 65° C., the second roller (23) was set to 210° C., and the third roller (24) was set to 180° C. The fourth roller (25) was at 140° C. As for the drawing allocations, a first roller/take-up roller speed ratio was set to 1.01 times so that the fiber was under tension between the take-up roller and the first roller, and the fiber was drawn to 3.55 times between the first roller and the second roller, and to 1.60 times between the second roller and the third roller. The surface roughness of the second roller was 1.5 µm. In the heat fixation, the fourth roller/third roller speed ratio was set to 1.0 times, and the fiber was relaxed by setting the speed ratio from the fourth roller to the winding machine to 0.93 times and taken up. The interlace-imparting device was disposed between the fourth roller (25) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric. The evaluation results and the like of the obtained fabric are shown in Table 1.

Heat fixation was performed by adjusting the relaxation speed ratio to provide a low tension as compared with Comparative Example 3. The average value of the middle load modulus was decreased, and the variation was also decreased. However, the average value of the middle elastic elongation was increased. The amount of gas leak in inflation was large. The permeability unevenness of the non-coated fabric was large, and the burst resistance performance was unstable.

Comparative Example 5

Similarly to Comparative Example 1, spinning was performed using the apparatus shown in FIG. 2. The take-up roller (21) was set to room temperature, the first roller (22) was set to 65° C., the second roller (23) was set to 220° C., and the third roller (24) was set to 180° C. The fourth roller (25) was at 140° C. As for the drawing allocations, a first roller/take-up roller speed ratio was set to 1.01 times so that the fiber was under tension between the take-up roller and the first roller, and the fiber was drawn to 3.45 times between the first roller and the second roller, and to 1.45 times between the second roller and the third roller. The surface roughness of the second roller was 1.5 µm. In the heat fixation, the fourth roller/third roller speed ratio was set to 1.0 times, and the fiber was relaxed by setting the speed ratio from the fourth roller to the winding machine to 0.92 times and taken up. The interlace-imparting device was disposed between the fourth roller (25) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric. The evaluation results and the like of the obtained fabric are shown in Table 1.

Because of a large percentage of cold drawing and a low total draw ratio, the average value of the middle load modulus of the obtained polyamide 66 fiber was smaller, and the average value of the middle elastic elongation was large. On the other hand, the variation of the middle load modulus was small, and the amount of gas leak in inflation was large. The tenacity of the obtained fiber was 8.0 cN/dtex and despite low tenacity, burst did not occur but opening was observed, which is because the amount of gas leak was too large. Accordingly, a cushioning function cannot be expected.

Comparative Example 6

The apparatus shown in FIG. 2 was used. A nylon 66 polymer having a 90% formic acid relative viscosity of 80 obtained by a conventional polymerization method was melted at 300° C., subjected to temperature equalization by a spin head (1), extruded from a spinneret (2) having a number of holes of 72, and taken up by a direct spinning drawing process, whereby a polyamide 66 fiber of 470 dtex and 72 filaments was produced. More specifically, the extruded nylon 66 polymer was cooled and solidified in a cold air chamber (3) to form a filament, and the filament was passed sequentially through an oil feed roller (4), a take-up roller (21) and from a first roller (22) to a fourth roller (25). After stabilizing the yarn travel by a yarn path regulating guide (9), interlace was imparted to the filaments by an interlace-imparting device (10), and the fiber was taken up.

As for the temperature of each roller, the take-up roller (21) was set to room temperature, the first roller (22) was set to 65° C., the second roller (23) was set to 230° C., and the third roller (24) was set to 200° C. The fourth roller (25) was at 140° C. As for the drawing allocations, a first roller/take-up roller speed ratio was set to 1.01 times so that the fiber was under tension between the take-up roller and the first roller, and the fiber was drawn to 2.00 times between the first roller and the second roller, and to 2.55 times between the second roller and the third roller. In the heat fixation, the fourth roller/third roller speed ratio was set to 1.0 times, and the fiber was relaxed by setting the speed ratio from the fourth roller to the winding machine to 0.91 times and taken up. The surface roughness of the second roller (23) was made as large as 4.0 µm in terms of Ra. The interlace-imparting device was disposed between the fourth roller (25) and the winding machine (11), where the pressure when applying compressed air to the interlace-imparting device was 0.3 MPa and the air feed energy was 0.74 kW. The amount of the spin finish applied was 1.0 wt %. The physical properties and the like of the obtained polyamide 66 fiber are shown in Table 1.

Weaving was performed in the same manner as in Example 1 by using the obtained polyamide 66 fiber to obtain a non-coated fabric. The evaluation results and the like of the obtained fabric are shown in Table 1.

Since the cold draw ratio was decreased in the draw ratio allocations and furthermore, the surface roughness of the drawing roll was adjusted, the yarn-making process at a high draw ratio was stabilized and the number of broken filaments in yarn was decreased, as a result, in the weaving process, the number of loom stops was small and the process was stable. In the heat fixation, because of a large degree of relaxation, the average value of the middle load modulus was somewhat small, the inflation pressure of the bag was low, and the amount of air leak was large. The crank angle in weaving was large and the variation thereof was somewhat kept low, but the permeability unevenness of the non-coated fabric was slightly large and the amount of air leak was also large, resulting in occurrence of burst.

TABLE 1

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Fineness (dtex) | 470 | 470 | 470 | 470 | 470 | 470 | 470 | 470 | 470 | 235 |
| Middle load modulus (cN/dtex) | 85 | 100 | 100 | 85 | 85 | 85 | 85 | 85 | 85 | 85 |
| Variation coefficient of middle load modulus, CV (%) | 2.1 | 2.1 | 4.8 | 2.1 | 2.1 | 2.1 | 2.1 | 2.1 | 2.5 | 4.2 |
| Middle elastic elongation (%) | 11.4 | 10.8 | 10.8 | 11.2 | 11.0 | 11.2 | 11.4 | 11.4 | 11.8 | 10.9 |
| Number of filaments (counts) | 72 | 72 | 72 | 140 | 180 | 72 | 72 | 72 | 60 | 72 |
| Interlace length (mm) | 3.0 | 3.0 | 3.5 | 3.5 | 3.5 | 2.5 | 3.0 | 3.0 | 3.0 | 3.5 |
| Non-interlace length (mm) | 50 | 50 | 45 | 50 | 45 | 60 | 50 | 50 | 60 | 50 |
| Variation coefficient of non-interlace length, CV (%) | 20 | 20 | 30 | 15 | 15 | 30 | 20 | 20 | 20 | 15 |
| Shrinkage in boiling water (%) | 7.0 | 7.0 | 7.0 | 7.0 | 7.0 | 6.5 | 7.0 | 7.0 | 7.0 | 7.0 |
| Adhesion Ratio of Spin Finish (wt %) | 1.0 | 1.0 | 1.0 | 1.0 | 1.0 | 1.0 | 1.0 | 1.6 | 1.0 | 1.0 |
| Tensile strength (cN/dtex) | 9.8 | 9.8 | 9.8 | 9.8 | 9.8 | 9.8 | 9.8 | 9.8 | 9.8 | 9.8 |
| Crank angle (°) | 265 | 250 | 250 | 260 | 255 | 260 | 265 | 270 | 275 | 250 |
| Variation coeffecient of crank angle, CV (%) | 9 | 9 | 12 | 9 | 7 | 12 | 9 | 12 | 12 | 9 |
| Variation coefficient of permeability, CV (%) | 10 | 10 | 15 | 10 | 10 | 15 | 20 | 15 | 18 | 10 |
| Loom stop frequency | A | A | A | A | A | B | A | A | A | A |
| Inflation pressure (kPa) | 25 | 25 | 25 | 25 | 25 | 25 | 25 | 25 | 25 | 25 |
| Burst resistance | A | A | A | A | A | A | A | A | A | A |

|  | Example | | | Comparative Example | | | | | |
| --- | --- | --- | --- | --- | --- | --- | --- | --- | --- |
|  | 11 | 12 | 13 | 1 | 2 | 3 | 4 | 5 | 6 |
| Fineness (dtex) | 470 | 470 | 470 | 470 | 470 | 470 | 470 | 470 | 470 |
| Middle load modulus (cN/dtex) | 93 | 85 | 76 | 70 | 70 | 85 | 75 | 65 | 75 |
| Variation coefficient of middle load modulus, CV (%) | 2.1 | 4.0 | 4.0 | 5.5 | 7.0 | 6.0 | 6.0 | 5.0 | 4.0 |
| Middle elastic elongation (%) | 10.7 | 10.8 | 12.0 | 12.4 | 12.4 | 11.4 | 12.3 | 13.3 | 12.8 |
| Number of filaments (counts) | 72 | 72 | 72 | 72 | 72 | 72 | 72 | 72 | 72 |
| Interlace length (mm) | 3.0 | 1.0 | 3.0 | 3.0 | 3.0 | 3.0 | 3.0 | 3.0 | 3.0 |
| Non-interlace length (mm) | 50 | 90 | 50 | 50 | 50 | 50 | 50 | 50 | 50 |
| Variation coefficient of non-interlace length, CV (%) | 20 | 50 | 20 | 20 | 25 | 25 | 20 | 25 | 20 |
| Shrinkage in boiling water (%) | 8.0 | 7.0 | 7.5 | 7.0 | 7.0 | 9.5 | 7.5 | 7.0 | 4.8 |
| Adhesion Ratio of Spin Finish (wt %) | 1.0 | 1.0 | 1.0 | 1.0 | 1.0 | 1.0 | 1.0 | 1.0 | 1.0 |
| Tensile strength (cN/dtex) | 9.8 | 9.8 | 9.5 | 9.5 | 9.6 | 9.8 | 9.5 | 8.0 | 8.7 |
| Crank angle (°) | 250 | 255 | 275 | 280 | 280 | 265 | 280 | 285 | 283 |
| Variation coeffecient of crank angle, CV (%) | 10 | 15 | 13 | 20 | 25 | 20 | 20 | 12 | 15 |
| Variation coefficient of permeability, CV (%) | 15 | 23 | 20 | 25 | 30 | 25 | 25 | 15 | 20 |
| Loom stop frequency | A | B | A | B | B | B | B | A | A |
| Inflation pressure (kPa) | 25 | 18 | 18 | 15 | 15 | 25 | 15 | 7 | 15 |
| Burst resistance | A | B | B | C | C | C | C | B | C |

INDUSTRIAL APPLICABILITY

The present invention provides a synthetic fiber suitable for weaving a high-density fabric, and the synthetic fiber of the present invention is suitable for high-speed weaving. Furthermore, the synthetic fiber of the present invention can be used for a fabric in airbag application. Above all, the synthetic fiber of the present invention is a high-tenacity fiber and can be used as a coated or non-coated airbag fabric having a uniform weave density and uniform low air permeability.

DESCRIPTION OF REFERENCE NUMERALS

1 Spin head
2 Spinneret
3 Cold air chamber
4 Oil feed roller
9 Yarn path regulating guide
10 Interlace-imparting device
11 Winding machine
21 Take-up roller
22 First roller
23 Second roller
24 Third roller
25 Fourth roller
26 Fifth roller
a Interlaced part length of filaments
b Non-interlaced part length of filaments

Figure 5:
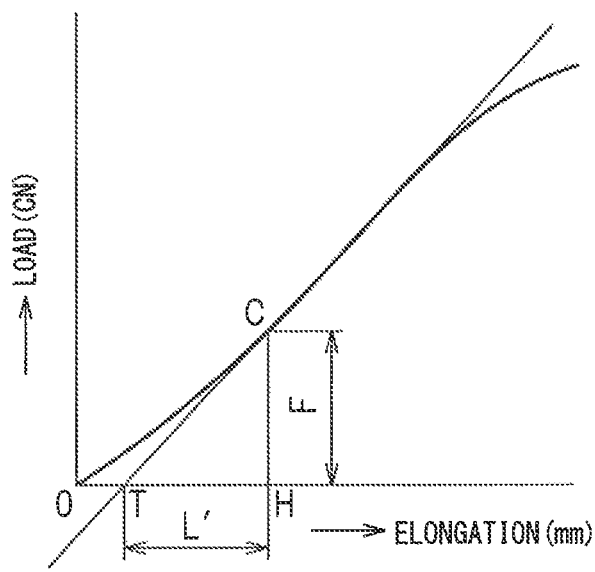
FIG. 5 A view illustrating the load-elongation curve for determining the middle load modulus.

The invention claimed is:

1. A synthetic fiber, wherein the fineness is from 200 to 720 dtex, the average value of the middle load modulus is from more than 75 cN/dtex to less than 150 cN/dtex, and the variation coefficient of said middle load modulus is 5% or less, wherein said middle load modulus is represented by the formula:

$$R = F/(L'/L \times d)$$

wherein F is the load (cN) at the maximum point C at the tangential angle observed substantially in the middle between the original point and the breaking load in a load-elongation curve as shown in FIG. 5, L is the sample length before elongation, L' is the length (T-H) between the intersection H of the perpendicular line drawn from the point C with the elongation axis and the intersection T of the tangent line with the elongation axis, and d is the fineness (dtex), and wherein said variation coefficient CV of said middle load modulus is represented by the formula:

$$CV(\%) = (s/X) \times 100$$

wherein s is the standard deviation, and X is the average value, wherein the average value and variation coefficient of the middle load modulus are obtained by arbitrarily sampling 50 samples in the fiber length direction of the fiber, wherein said synthetic fiber has a shrinkage in boiling water of 5.5% or more, and wherein said synthetic fiber has a tensile strength of 8.5 cN/dtex or more.

2. The synthetic fiber according to claim 1, wherein the average value of the middle load modulus is from more than 80 cN/dtex to less than 120 cN/dtex.

3. The synthetic fiber according to claim 1, wherein the average value of the middle elastic elongation is from 10 to 12%.

4. A multifilament yarn of the synthetic fiber according to claim 1, wherein the number of filaments is from 65 to 200, and said multifilament yarn has interlaced parts and non-interlaced parts.

5. The multifilament yarn according to claim 4, wherein the average value of the non-interlaced part length is from 10 to 65 mm.

6. The multifilament yarn according to claim 5, wherein the average value of the interlaced part length is 20 mm or less and the variation coefficient of said non-interlaced part length is 30% or less.

7. The synthetic fiber according to claim 1, wherein the shrinkage in boiling water is 7.0% or more.

8. The synthetic fiber according to claim 1, wherein the synthetic fiber is a polyamide fiber.

9. The synthetic fiber according to claim 1 prepared by the method comprising the steps of:

subjecting a filament spun out of a spinneret to multistage drawing consisting of cold drawing stage and hot drawing stage, wherein the cold drawing stage ratio is from 25 to 55% based on the total drawing ratio and then subjecting it to multistage temperature-drop heat fixation.

10. The synthetic fiber according to claim 1, which is used for an airbag fabric.

11. An airbag base fabric comprising the synthetic fiber according to claim 1.

12. An airbag comprising the airbag base fabric according to claim 11.

* * * * *